(12) United States Patent
Karaoguz et al.

(10) Patent No.: US 9,651,675 B2
(45) Date of Patent: May 16, 2017

(54) ESTIMATING FREQUENCY OF A GNSS ENABLED DEVICE BASED ON TIME STAMPS

(75) Inventors: Jeyhan Karaoguz, Irvine, CA (US); Charles Abraham, Los Gatos, CA (US); Mark Buer, Gilbert, AZ (US); David Garrett, Tustin, CA (US); David Albert Lundgren, Mill Valley, CA (US); David Murray, Mission Viejo, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 575 days.

(21) Appl. No.: 12/748,050

(22) Filed: Mar. 26, 2010

(65) Prior Publication Data

US 2011/0199262 A1   Aug. 18, 2011

Related U.S. Application Data

(60) Provisional application No. 61/306,727, filed on Feb. 22, 2010.

(51) Int. Cl.
| | |
|---|---|
| *G01S 19/25* | (2010.01) |
| *G01S 19/23* | (2010.01) |
| *G01S 19/36* | (2010.01) |
| *G01S 19/37* | (2010.01) |

(52) U.S. Cl.
CPC .............. *G01S 19/25* (2013.01); *G01S 19/23* (2013.01); *G01S 19/256* (2013.01); *G01S 19/36* (2013.01); *G01S 19/37* (2013.01)

(58) Field of Classification Search
USPC .......................... 342/357.64, 357.62, 357.42
See application file for complete search history.

(56) References Cited

U.S. PATENT DOCUMENTS

| | | | | |
|---|---|---|---|---|
| 5,663,735 | A * | 9/1997 | Eshenbach | 342/357.62 |
| 5,841,396 | A * | 11/1998 | Krasner | 342/357.75 |
| 6,178,195 | B1 * | 1/2001 | Durboraw et al. | 375/136 |
| 6,678,510 | B2 * | 1/2004 | Syrjarinne et al. | 455/255 |
| 6,697,016 | B1 * | 2/2004 | Voor et al. | 342/357.62 |
| 6,724,342 | B2 * | 4/2004 | Bloebaum et al. | 342/357.62 |

(Continued)

*Primary Examiner* — Gregory C Issing
(74) *Attorney, Agent, or Firm* — Sterne, Kessler, Goldstein & Fox P.L.L.C.

(57) ABSTRACT

A GNSS enabled device that is communicatively coupled to a network, receives time stamps via the network. The time stamps are generated based on reference clock signals within the network. GNSS receiver clock signal frequency may be adjusted based on the time stamps. When GNSS satellite signals and/or SRN signals are not available, the time stamps enable synchronization with GNSS satellites. Network clock signals and/or time stamps may be generated by an access point, a DSL modem, a cable modem and/or a primary reference clock within the network. A series of time stamps may be utilized for adjusting frequencies. Clock signals may be generated for adjusting frequencies based on a comparison between time stamps and oscillator or mixer output. Clock signals are generated for baseband, intermediate and/or RF frequency signal processing. GNSS satellite signals may be demodulated, correlated with a pseudonoise code sequence and/or synchronized based on the time stamps.

15 Claims, 4 Drawing Sheets

(56) References Cited

U.S. PATENT DOCUMENTS

| | | | |
|---|---|---|---|
| 6,768,452 B2 * | 7/2004 | Gilkes | 342/357.52 |
| 6,816,111 B2 * | 11/2004 | Krasner | 342/357.62 |
| 6,839,547 B2 * | 1/2005 | Nir et al. | 455/71 |
| 6,850,745 B2 * | 2/2005 | Anand | H04B 1/406 331/16 |
| 6,965,754 B2 * | 11/2005 | King | 455/12.1 |
| 7,010,307 B2 * | 3/2006 | Abraham | 455/456.1 |
| 7,155,183 B2 * | 12/2006 | Abraham | 455/192.1 |
| 7,266,140 B1 * | 9/2007 | Hasegawa et al. | 375/130 |
| 7,747,236 B1 * | 6/2010 | Poberezhskiy | G01S 19/235 455/255 |
| 2003/0225893 A1 | 12/2003 | Roese | |
| 2004/0132421 A1 * | 7/2004 | Underbrink | 455/255 |
| 2005/0080561 A1 * | 4/2005 | Abraham et al. | 701/213 |
| 2006/0095206 A1 * | 5/2006 | Garin et al. | 701/213 |
| 2008/0158050 A1 * | 7/2008 | Levy | 342/357.02 |
| 2009/0054075 A1 * | 2/2009 | Boejer et al. | 455/456.1 |

* cited by examiner

FIG. 3 ating Frequency of a GNSS
ESTIMATING FREQUENCY OF A GNSS ENABLED DEVICE BASED ON TIME STAMPS

CROSS-REFERENCE TO RELATED APPLICATIONS/INCORPORATION BY REFERENCE

This application makes reference to, claims priority to, and claims the benefit of U.S. Provisional Application Ser. No. 61/306,727, filed on Feb. 22, 2010, which is incorporated herein by reference in its entirety.

This application also makes reference to:

U.S. Provisional Patent Application Ser. No. 61/304,128 which was filed on Feb. 12, 2010;

U.S. patent application Ser. No. 12/748,159, filed on even date herewith;

U.S. Provisional Patent Application Ser. No. 61/306,393 which was filed on Feb. 19, 2010;

U.S. patent application Ser. No. 12/748,225, filed on even date herewith;

U.S. Provisional Patent Application Ser. No. 61/303,908 which was filed on Feb. 12, 2010; and U.S. patent application Ser. No. 12/732,665, filed on even date herewith, now U.S. Pat. No. 8,305,267, issued Nov. 6, 2012.

Each of the above stated applications is hereby incorporated herein by reference in its entirety.

FIELD OF THE INVENTION

Certain embodiments of the invention relate to wired communication systems. More specifically, certain embodiments of the invention relate to estimating frequency of a GNSS enabled device based on time stamps.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, Time of Arrival (TOA), Observed Time Difference of Arrival (OTDOA), Enhanced Observed Time Difference (E-OTD) as well as the Global navigation satellite-based systems (GNSS) such as Global Positioning System (GPS), Global Navigation Satellite System (GLONASS), Galileo, and/or Assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for estimating frequency of a GNSS enabled device based on time stamps.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for estimating frequency of a GNSS enabled device based on time stamps. In a GNSS enabled communication device that is communicatively coupled to a network, time stamps may be received via the network, and may be generated based on one or more reference clock signals within the network. A frequency that controls a GNSS receiver within the GNSS enabled communication device may be adjusted based on the received time stamps. Synchronization may be established and/or maintained with analog and/or digital GNSS satellite signals based on the time stamps. For example, when information that might enable the synchronization is not available from one or both of GNSS satellite signals and satellite reference network signals or is not adequate, synchronization may be established and/or maintained based on information in the time stamps.

The reference clock signals for the time stamps may be generated in one or more of an access point, a DSL Modem, a cable modem and a primary reference clock within the network, for example. A series of the time stamps may be received and utilized for adjusting the frequencies of clock signals in the GNSS enabled device. Information from the time stamps may be compared to information output from one or both of an oscillator and a mixer in the GNSS enabled communication device. A signal may be generated in the GNSS enabled communication device for adjusting the frequencies of the clock signals. The signal may be generated based on a comparison between information from the time stamps, and output from one or both of an oscillator and mixer in the GNSS enabled communication device. Clock signals may be generated based on the time stamps, for one or more of baseband processing, intermediate frequency band signal processing and RF frequency band signal processing. The GNSS enabled communication device may be operable to demodulate a GNSS satellite signal, correlate with a GNSS satellite signal pseudonoise code sequence and/or synchronize with a GNSS satellite signal based on the time stamps. In this manner, the GNSS enabled communication device may update frequencies utilized for processing GNSS satellite signals based on time stamps.

Figure 1:
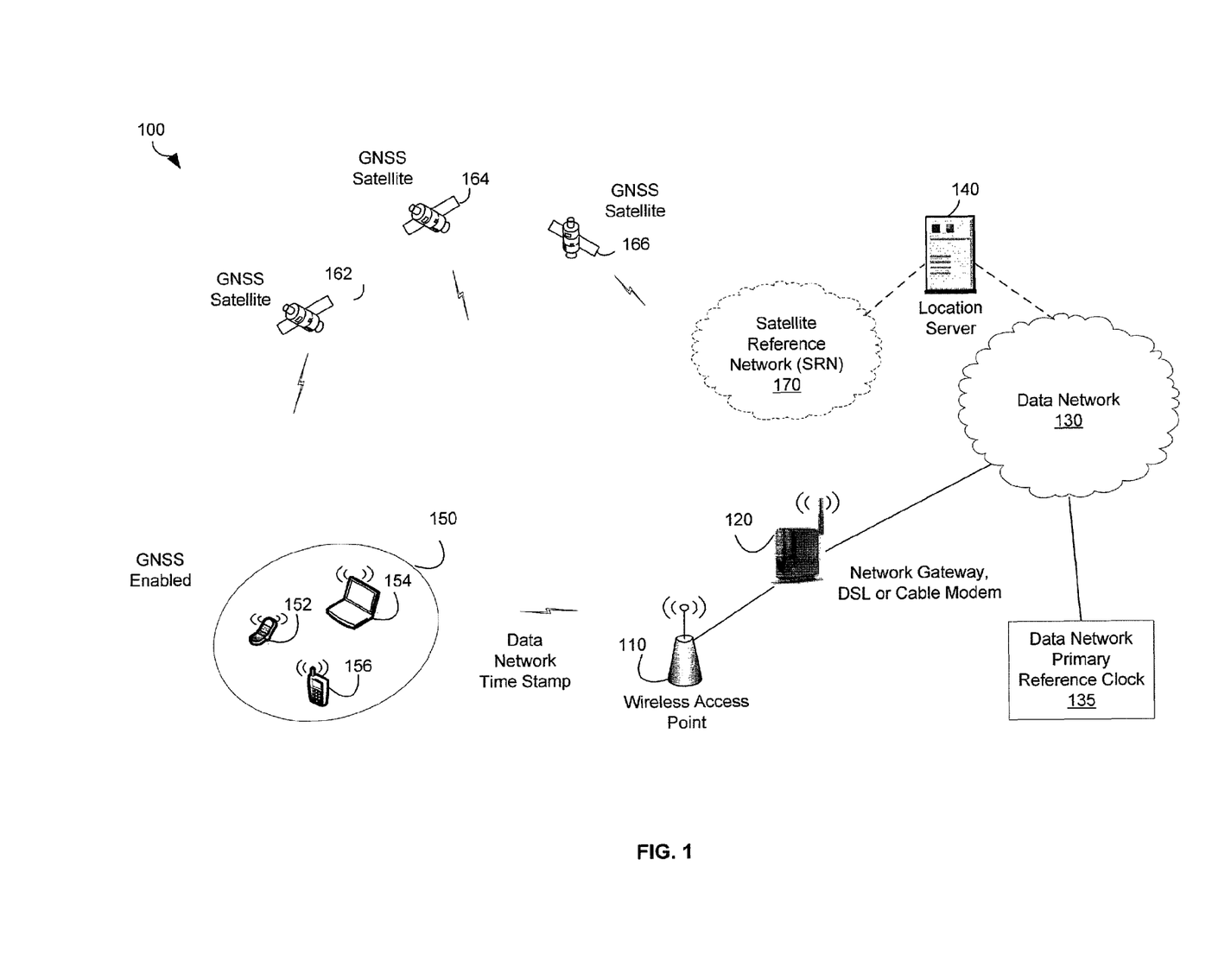
FIG. 1 is a diagram illustrating an exemplary communication system that is operable to utilize network time stamps to update frequencies in a GNSS receiver, in accordance with an embodiment of the invention.

FIG. 1 is a diagram illustrating an exemplary communication system that is operable to utilize network time stamps to update frequencies in a GNSS receiver, in accordance with an embodiment of the invention. Referring to FIG. 1, there is shown a communication system 100. The communication system 100 comprises a plurality GNSS enabled communication devices 150, of which the GNSS enabled devices 152, 154 and 156 are illustrated, and a plurality of GNSS satellites, of which GNSS satellites 162, 164 and 166 are illustrated. In addition, there is shown a wireless access point 110, a network gateway 120, a data network 130, a data network primary reference clock 135, a location server (LBS) 140 and a satellite reference network (SRN) 170.

The plurality of GNSS enabled communication devices 150 may comprise suitable logic, circuitry, interfaces and/or code that may be operable to communicate based on one or more of a variety of wireless and/or wired communication protocols. For example, the plurality of GNSS enabled communication devices 150 may be operable to communicate with one or more of a satellite network, for example, a GNSS network, a wide area network, for example, a cellular network, a local area network, for example, a WiFi network or a WLAN and/or a personal area network, for example, via a Bluetooth connection. Exemplary GNSS enabled communication devices 150 may comprise a mobile phone, a laptop, a media player, a gaming device, a medical device and/or a location determination device although the invention is not limited in this regard. The GNSS enabled communication devices 150 may comprise mobile, portable and/or stationary devices. One or more of the GNSS enabled communication devices 150 may be operable to communicate with devices in other networks via the wireless access point 110, the network gateway 120 and/or the data network 130. GNSS enabled communication devices may be referred to as GNSS enabled devices.

The GNSS enabled devices 150 may be operable to determine location and/or time based on one or more methods. For example, the GNSS enabled devices 150 may be operable to determine location and/or time autonomously, with assistance data from a network device and/or with user input. In this regard, the plurality of GNSS enabled devices 150 may comprise a GNSS receiver and may be operable to determine location utilizing GNSS satellite system data, for example, from the GNSS satellites 162, 164 and/or 166. The GNSS enabled devices 150 may be operable to utilize GNSS satellite data to determine location autonomously and/or with assistance from various network elements, for example, the data network 130, the location server 140 and/or the satellite reference network (SRN) 170.

The GNSS enabled devices 150 may comprise the mobile devices 152, 154 and/or 156. The GNSS enabled devices 150, for example, the GNSS enabled devices 152 may comprise suitable logic, circuitry, interfaces and/or code that are operable to receive satellite broadcast signals from one or more GNSS satellites that may be in view, for example, the GNSS satellites 162, 164 and/or 166. The GNSS enabled devices 152 may take various GNSS measurements such as pseudorange and/or carrier phase on the received GNSS signals to calculate navigation information such as, for example, GNSS position of the GNSS enabled devices 152. The mobile device 152 may receive GNSS assistance information that may enable the GNSS enabled device 152 to determine its location.

In various embodiments of the invention, other network elements that may communicate with the GNSS enabled devices 150, for example, the wireless access point 110, the network gateway 120 and/or one or more other devices in the data network 130 such as the data network primary reference clock 135, may be operable to provide timing information to the GNSS enabled devices 150. For example, the network timing information may be provided within time stamped communication to one or more of the GNSS enabled devices 150. The network provided timing information may be utilized by the GNSS enabled devices 150 to update GNSS receiver timing and/or to compensate for frequency drift and/or phase variation. For example, the network provided timing information may enable the GNSS enabled devices 150 to lock on to signals and/or to maintain synchronization with signals received from GNSS satellites such as the GNSS satellites 162, 164 and/or 166. In this regard, the network provided timing information may enable locking and/or maintaining synchronization with one or more GNSS FM modulated signals, one or more GNSS pseudorandom code sequences. The GNSS signals may comprise, for example, pilot signals and/or a data bearing signals.

The GNSS satellites 162, 164 and/or 166 may comprise suitable logic, circuitry, interfaces and/or code that may be operable to generate and broadcast satellite navigational information. The broadcast satellite navigational information may be retrieved and utilized by one or more of the mobile devices 152, 154 and/or 156 to calculate their location and/or to determine time. Moreover, the GNSS satellites 162, 164 and/or 166 may comprise suitable logic, circuitry, interfaces and/or code that may be operable to generate and broadcast satellite navigational information for the SRN 170. The broadcast satellite navigational information may be collected by the SRN 170 to be utilized by the location server 140 and/or the mobile devices 152, 154 and/or 156 to enhance location based services (LBS) performance and/or assist in location determination. The GNSS satellites 162, 164 and/or 166 may comprise GPS, Galileo, and/or GLONASS satellites.

The satellite reference network (SRN) 170 may comprise suitable logic, circuitry, interfaces and/or code that are operable to acquire, collect and/or distribute data from GNSS satellites on a continuous basis. The SRN 170 may comprise a plurality of GNSS reference tracking stations located around the world to provide assisted GNSS coverage. The SRN 170 may be communicatively coupled with the data network 130 and/or the location server 140, for example.

The location server 140 may comprise suitable logic, circuitry, interfaces and/or code that are operable to access the satellite reference network (SRN) 170 and may collect GNSS satellite data. The location server 140 may track GNSS constellations through the SRN 170. The location server 140 may be operable to utilize the collected GNSS satellite data from the SRN 170 to generate GNSS assistance data comprising, for example, ephemeris data, long term orbit (LTO) data, reference positions and/or GNSS generated time information, for assisting in location determination by mobile devices and/or network devices. The location server 140 may provide the GNSS assistance data to one or more of the mobile devices 152, 154 and 156 via the network gateway 120 and the wireless access point 110, for location determination assistance, for example.

The network gateway 120 may comprise suitable logic, circuitry, interfaces and/or code that are operable to connect various communication devices in one type of network or utilizing one type of transport medium to another type of network or transport medium. For example, the network gateway 120 may comprise a cable modem and/or a DSL modem. The network gateway 120 may be operable to route services to an intended communication device such as the GNSS enabled device 152, from the data network 130 via the wireless access point 110. The network gateway 120 may be operable to receive timing information from the data network 130 and may distribute the timing information to the wireless access point 110. The timing information may be communicated to the GNSS enabled devices 150 by the wireless access point 110. The timing information may be utilized by the GNSS enabled devices 150 as a reference frequency. The timing information may be referred to as reference clock signals and/or a reference frequency, for example.

The reference clock signals may originate from the data network primary reference clock 135 and may be distributed via the data network 130 to the network gateway 120, the wireless access point 110 and the GNSS devices 150. Notwithstanding, the reference clock signals may be generated by other devices that are communicatively coupled to the data network 130. For example, the network gateway 120 may generate reference clock signals. Reference clock signals received by the GNSS enabled devices 150 may be utilized to update frequencies that are utilized for demodulating or decoding signals received from the GNSS satellites 162, 164 and/or 166. In various embodiments of the invention, the reference clock signals may enable synchronization with signals comprising high precision frequencies and/or phase variations. The network gateway 120 may be operable to time stamp packet data and/or to send control signals that comprise the timing information and may send the timing information to the wireless access point 110 and/or to the GNSS enabled devices 150. One or more of the network gateway 120, the wireless access point 110 and the GNSS enabled devices 150 may be operable to determine a time delay for signals communicated between two devices. The time delay may be utilized for correcting the reference clock signals that may be distributed among the network gateway 120, the access point 110 and one or more of the GNSS enabled devices 150.

The wireless access point 110 may comprise suitable logic, circuitry, interfaces and/or code that are operable to provide wireless access for one or more of the GNSS enabled devices 150 to a wireless or wired network using Wi-Fi, WiMax, Bluetooth, Ultrawideband (UWB), 60 GHz, and/or related standards or other local area or short range networking technologies. The wireless access point 110 may comprise suitable logic, circuitry, interfaces and/or code that may be operable to handle communication between one or more of the GNSS enabled devices 150 and one or more other devices via the network gateway 120 and/or the data network 130 for example. The wireless access point 110 may be configured to transmit beacon frames, for example, a few times each second. The transmitted beacon frames may comprise network information such as, for example, network timing information, Service Set Identifier (SSID), capabilities and/or supported rates. The information in the beacon frames may be utilized by the communication devices 150 to adjust timing, frequency and/or phase in a GNSS receiver, for example. The information in the beacon frames may enable the GNSS receivers to establish and/or maintain synchronization with a GNSS signal received from one or more of the GNSS satellites 162, 164 and/or 166, for example.

The data network 130 may comprise suitable devices, circuitry, interfaces and/or code that are operable to support data communication between one or more of the GNSS enabled devices 150 and one or more devices that may be communicatively coupled to the data network 130. For example, the data network 130 may handle communication between the GNSS enabled devices 150 and the data network primary reference clock 135 within the data network 130. In addition, the data network 130 may handle communication between the GNSS enabled devices 150 and other networks, for example, the SRN 170 and/or the location server 140. The data network 130 may comprise a single network and/or one or more interconnected networks. For example, the data network 130 may comprise a private network or may comprise the Internet. In various embodiments of the invention, the data network 130 may support communication based on the Internet Protocol Suite of standards. The data network 130 may provide an interface to other networks, for example, to a cellular network and cellular base stations (not shown) that may be operable to communicate with the GNSS enabled devices 150.

The data network 130 may be operable to provide timing information to various network devices, for example, to the network gateway 120 and/or to the wireless access point 110. The timing information from the network 130 may be utilized to time stamp data and/or to synchronize the network devices. The data network 130 may be communicatively coupled to one or more primary reference clocks, for example, the data network primary reference clock 135 that may provide high precision and/or highly accurate timing information. The data network primary reference clock 135 may comprise an atomic clock, for example, that may be utilized to distribute timing information to various network devices. For example, timing information that may be generated by the data network primary reference clock 135 may be communicated to the network gateway 120 and/or to the data access point 110. Furthermore, the timing information may be communicated from the access point 110 to the GNSS enabled devices 150. For example, the timing information may be communicated in beacon frames and/or in other data and/or control information that may be communicated from the access point 110 to the GNSS enabled devices 150. The timing information may comprise time stamps based on timing information from the data network primary reference clock 135.

In operation, the data network primary reference clock 135 may generate reference clock signals. The reference clock signals may be distributed to various network devices via the data network 130, for example, in time stamps. The reference clock signals may be distributed to the network gateway 120. The network gateway 120 may distribute the reference clock signals to the access point 110 which may communicate the reference clock signals to the GNSS enabled devices 150. The GNSS enabled devices 150 may utilize the reference clock signals to update GNSS receiver clocks that may control synchronization with GNSS frequency modulated and/or code modulated signals, for example. The GNSS enabled devices 150 may utilize the reference clock signals to discipline oscillators. In this regard, the GNSS enabled devices 150 may be operable to control oscillator frequency, for example, by detecting and/or correcting frequency drift. The clock reference signals may also be utilized to generate one or more derived clock signals (as shown in FIG. 2B).

Figure 2A:
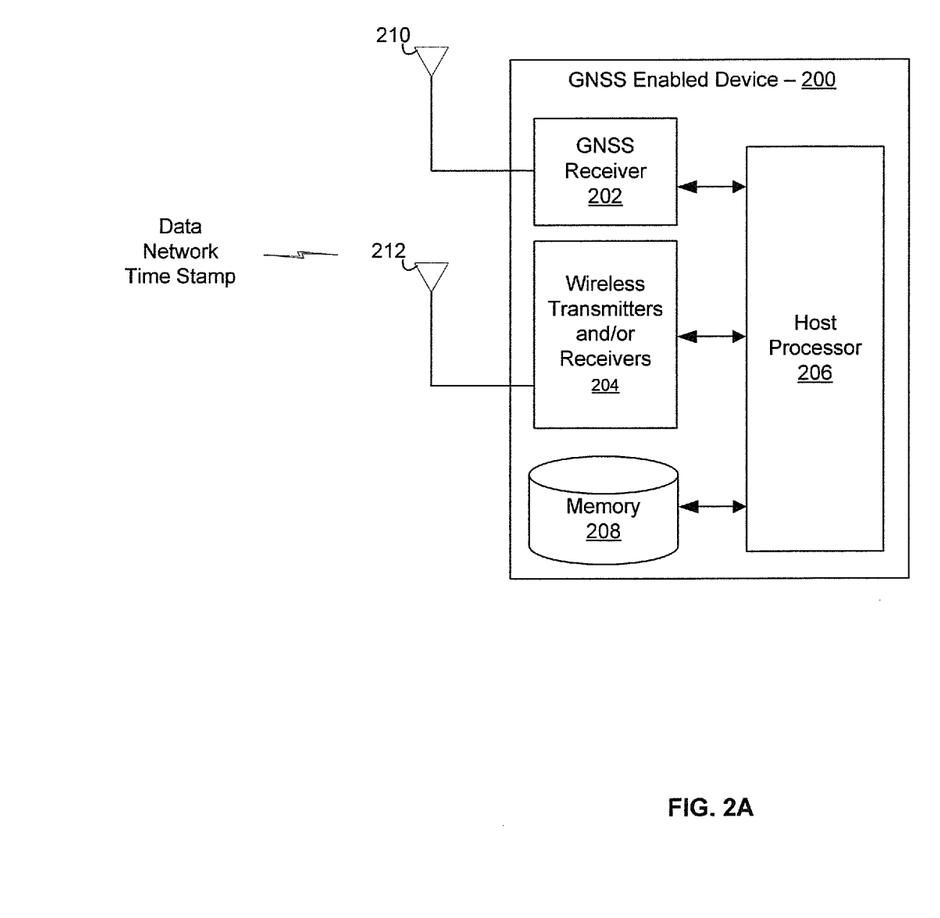
FIG. 2A is a block diagram illustrating an exemplary GNSS enabled device that is operable to update frequency in its GNSS receiver utilizing network time stamps, in accordance with an embodiment of the invention.
Figure 2B:
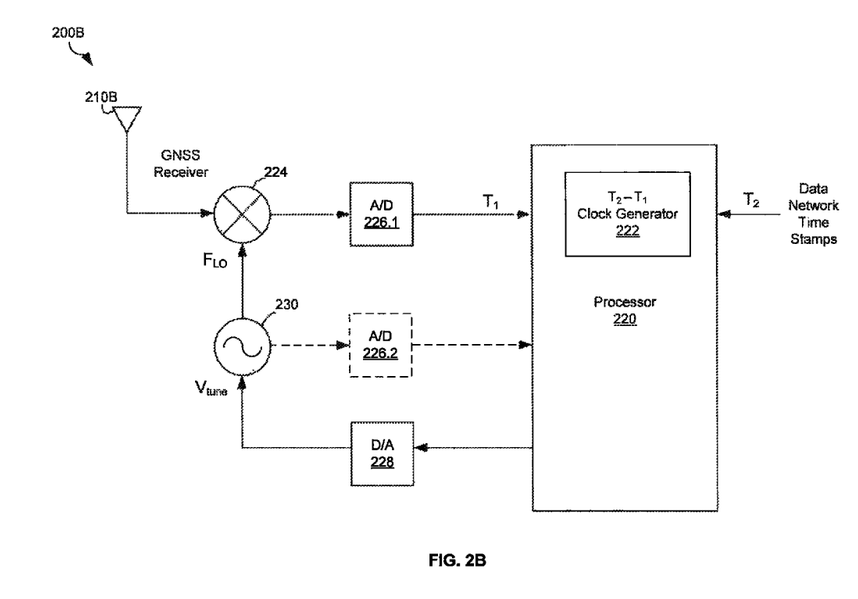
FIG. 2B is a block diagram illustrating an exemplary GNSS enabled device that is operable to update and/or maintain frequencies in its GNSS receiver utilizing network time stamps, in accordance with an embodiment of the invention.

FIG. 2A is a block diagram illustrating an exemplary GNSS enabled device that is operable to update frequency in its GNSS receiver utilizing network time stamps, in accordance with an embodiment of the invention. Referring to FIG. 2A, there is shown a GNSS enabled device 200. The GNSS enabled device 200 may comprise a GNSS receiver 202, an GNSS antenna 210 one or more wireless transmitters and/or receivers 204, an antenna 212, a host processor 206 and a memory 208.

The GNSS enabled device 200 may be similar and/or substantially the same as one or more of the GNSS enabled devices 150. The GNSS enabled device 200 may comprise a mobile or stationary device. The GNSS enabled device 200 may comprise a GNSS receiver 202 and may be operable to determine its location autonomously and/or with assistance from one or more network devices, for example, the data network primary reference clock 135 and/or from other networks, for example, from the location based services (LBS) server 140 and/or the satellite reference network (SRN) 170.

The GNSS receiver 202 may comprise suitable logic, circuitry, interfaces and/or code that may be operable to detect and receive GNSS signals from a plurality of visible GNSS satellites such as the GNSS satellites 162, 164 and/or 166. The GNSS receiver 202 may be operable to utilize the received GNSS signals to calculate location information such as a GNSS position of the GNSS receiver 202 and/or to determine a time, for example. In various embodiments of the invention, the GNSS receiver 202 may utilize information from a location based server 140 for assisted and/or enhanced GNSS location determination. The location and/or time information may be provided to the host processor 206 and/or may be stored in the memory 208. In various embodiments of the invention, the GNSS receiver 202 may lose synchronization with the GNSS satellites 162, 164 and/or 166. Frequencies utilized for demodulating analog and/or digital signals such as FM signals and/or psuedonoise (PN) code sequences signals, may drift in the GNSS receiver 202. The frequency drift may cause the GNSS receiver 202 to lose sync with the GNSS signals from the GNSS satellites 162, 164 and 166. The GNSS receiver 202 may utilize timing information received via the access point 110 and/or the network gateway 120 to update the GNSS receiver frequencies. The time information received via the access point 110 may comprise reference clock signals that may be generated by the network gateway 120 and/or by the data network primary reference clock 135, for example. The timing information may enable the GNSS receiver 202 to obtain and/or maintain synchronization and/or to lock onto signals sent from GNSS satellites such as the GNSS satellites 162, 164 and/or 166. For example, the timing information generated by the network gateway 120 and/or by the data network primary reference clock 135 may be utilized by the GNSS receiver 202 to lock onto an FM signal, to synchronize with a time slot and/or to correlate a pseudonoise code sequence.

One or more wireless transmitters and/or receivers 204 may comprise suitable logic, circuitry, interfaces and/or code that may be operable to communicate based on one or more radio access protocols, for example, CDMA, GSM, UMTS, LTE, WiMAX, WiFi, Bluetooth and/or Zigbee, although the invention is not limited in this regard. For example, one or more of the wireless transmitters and/or receivers 204 may be operable to communicate with the wireless access point 110 based on IEEE 802.11 standards and/or based on Bluetooth specifications. Furthermore, one or more of the wireless transmitters and/or receivers 204 may be operable to communicate with other communication devices such as the wireless access point 110, a mobile phone, a laptop, a desk top computer, a printer, a scanner, a television, a video camera or a set-top-box. In this regard, one or more of the wireless transceivers 204 may be operable to receive the reference clock signals generated by the data network primary reference clock 135 and/or by the network gateway 120, for example.

The antennas 210 and/or 212 may comprise suitable logic, circuitry, interfaces and/or code that may be operable to transmit and/or receive signals to and/or from one or more wireless devices and/or network devices. For example, the antenna 212 may be configured to communicate with the wireless access point 110 and/or a cellular base station (not shown). The antenna 210 may be operable to receive signals from the GNSS satellites 162, 164 and 166, for example. In various embodiments of the invention, one or more transmitters and/or receivers in the GNSS enabled device 200 may be operable to share one or more antennas. For example, the GNSS receiver 202 and one or more of the transmitters and/or receivers 204 may share one or more antennas.

The host processor 206 may comprise suitable logic, circuitry, interfaces and/or code that may be operable to manage and/or control operations of the GNSS enabled device 200 components such as the GNSS receiver 202 and/or one or more of the wireless transmitters and/or receivers 204. The host processor 206 may be operable to establish and/or maintain a connection between the GNSS enabled device 200 and the access point 110 and/or to one or more other types of access networks, for example, a cellular network and/or a Bluetooth connection. The host processor 206 may be operable to request that the GNSS receiver 202, determine a location for the GNSS enabled device 200. The host processor 206 may be operable to activate and/or deactivate one or more associated radios such as one or more of the wireless transmitters and/or receivers 204 as needed, for receiving reference clock signals from the data network primary reference clock 135 and/or the network gateway 120. In various embodiments of the invention, the host processor 206 may be operable to retrieve timing information for the GNSS receiver 202 from a device in the data network 130, such as the network gateway 120 and/or the data network primary clock reference 135. In various embodiments of the invention, the data network timing information may be retrieved via a cellular base station (not shown). The host processor 206 may store the timing information in the memory 208. In addition, the host processor 206 may be operable to parse packet data and/or control data that may be received via the access point 110. For example, the host processor 206 may be operable to retrieve time stamps from the packet data and/or from beacon frames, which may be utilized by the GNSS receiver 202 for receiving and/or demodulating GNSS signals from GNSS satellites such as the satellites 162, 164 and/or 166. In this regard, the host processor 206 may receive a series of time stamps for the GNSS receiver 202. In various embodiments of the invention, the host processor 206 may comprise suitable logic, circuitry, interfaces and/or code that may be operable to determine a delay in reception of reference clock signals that may be received from one or more of the access point 110, the network gateway 120, the data network 130 and/or the data network primary clock reference 135. The determined delay may be utilized to adjust the reference clock signals.

The memory 208 may comprise suitable logic, circuitry, interfaces and/or code that may be operable to store information such as executable instructions and data that may be utilized by the host processor 206 and/or other device components such as, for example, the GNSS receiver 202, one or more of the wireless transmitters and/or receivers 204 and/or one or more of the antennas 210 and 212. The memory 208 may comprise storage for timing information from one or more of the access point 110, the network gateway 120, the data network 130 and/or the data network primary clock reference 135. The memory 208 may comprise RAM, ROM, low latency nonvolatile memory such as flash memory and/or other suitable electronic data storage.

In operation, the GNSS enabled device 200 may be operable to receive data network timing information, for example, reference clock signals that may be generated by the data network primary reference clock 135 and/or by the network gateway 120, for example. The data network timing information may comprise time stamps in packet data and/or control data, for example. The host processor 206 may parse the packet data and/or the control data to retrieve the timing information and may communicate the information to the GNSS receiver 202. The GNSS receiver 202 may utilize the timing information to discipline an oscillator and/or to generate one or more derivative clock signals. In this regard, the timing information may be utilized for demodulating an FM signal, for synchronizing with time slots and/or to correlate a pseudonoise code sequence, for example. In various embodiments of the invention, whenever the GNSS enabled device 200 loses contact with one or more of the GNSS satellites 162, 164 and/or 166 and/or from the SRN 170 and/or the LBS server 140, the GNSS enabled device 200 may utilize the data network timing information in the time stamps to establish and/or maintain reception of GNSS satellite signals.

FIG. 2B is a block diagram illustrating an exemplary GNSS enabled device that is operable to update and/or maintain frequencies in its GNSS receiver utilizing network time stamps, in accordance with an embodiment of the invention. Referring to FIG. 2B, there is shown a GNSS enabled device 200B that may comprise the antenna 210B, a mixer 224, an analog to digital converter 226, a processor 220, a clock generator 222, a digital to analog converter 228 and a local oscillator 230.

The GNSS enabled device 200b may comprise a portion of the GNSS enabled device 200 and/or a portion of the GNSS receiver 202. Furthermore, the GNSS enabled device 200b may comprise a portion of one or more of the GNSS enabled devices 150. The antenna 210B may be similar and/or substantially the same as the antenna 210. The processor 220 may be similar or substantially the same as the processor 206 and/or may be a processor within the GNSS receiver 202.

The mixer 224 may comprise suitable logic, circuitry, interfaces and/or code that may be operable to receive two input signals and may generate one or more output signals. The input signals may comprise, for example, GNSS signals received from one more GNSS satellites 162, 164 and/or 166 via the antenna 200B and a signal from the local oscillator 230. An output signal frequency from the mixer 224 may comprise a difference of the frequencies of the two input signals and/or a sum of the frequencies of the two input signals. The mixer 224 may down-convert the received GNSS satellite signals. The output of the mixer 224 may be communicated to the analog to digital converter 226 which may communicate the down-converted GNSS satellite signals to the processor 220. The frequency of the output signal from the mixer 224 may be utilized by the processor 220 to determine frequency adjustments for the oscillator 230. Moreover, the frequency of the output signal from the mixer 224 may be utilized by the processor 220 to generate internal clock signals, for example, for baseband processing.

The local oscillator 230 may comprise suitable logic, circuitry, interfaces and/or code that may be operable to output a signal comprising one or more frequencies for use by the mixer 224 and/or for use by the processor 220. The local oscillator 230 may be controlled, for example, by the processor 220, which may change output frequencies $F_{LO}$ of the oscillator 230. The output signal from the local oscillator 230 may be communicated to the mixer 224 and may be utilized by the mixer 224 to demodulate GNSS satellite signals received via the antenna 210B. In various embodiments of the invention, the output signals from the local oscillator 230 may be fed back to the analog to digital converter 226 and then communicated from the analog to digital converter 226 to the processor 220. The processor 220 may utilize oscillator 230 output signal frequencies and/or frequencies derived from the oscillator 230 output signals, with the received data network timing information to determine tuning signals for the oscillator 230. In this regard, the data network timing information may comprise data network reference clock signals. The data network reference clock signals may be generated by the network gateway 220 and/or generated by the data network primary reference clock 235, for example. Output signal frequencies from the oscillator 230 and/or from the mixer 224 may be compared with the data network timing information to determine a tuning signal that may discipline the oscillator 230. The tuning signal may be sent by the processor 220 to the digital to analog converter 228 which may send a signal $V_{tune}$ to the oscillator 230. The $V_{tune}$ signal may enable the GNSS enabled device 200B to establish and/or maintain reception of the GNSS satellite signal. For example, the $V_{tune}$ signal may enable the GNSS enabled device 200B to demodulate an FM GNSS satellite signal, to synchronize with a GNSS satellite signal time slot and/or to correlate with a GNSS satellite pseudorandom code sequence.

The analog to digital converter 226 may comprise suitable logic, circuitry, and/or code that may be operable to convert analog signals to corresponding digital values, where the digital values may comprise samples of the analog signals.

The digital to analog converter 228 may comprise suitable logic, circuitry, and/or code that may be operable to convert digital values to corresponding analog signals, where the analog signals may be generated based on the digital values.

The clock generator 222 may comprise suitable logic, circuitry, interfaces and/or code that may be operable to receive timing information, for example, a series of reference clock signals, that may be generated and/or distributed by the data network primary reference clock 135, the network gateway 120 and/or the access point 110, for example. The clock generator 222 may be operable to generate one or more clock signals based on the received timing information. For example, the clock generator 222 may be operable to generate clock signals that may be utilized to establish and/or update time, frequencies and/or phase in the GNSS enabled device 200B. In this regard, the clock generator 222 may be operable to generate clock signals that may be utilized to demodulate FM GNSS satellite signals, to synchronize with one or more GNSS satellite signals and/or to correlate a GNSS satellite pseudorandom code sequence, for example. In various embodiments of the invention, the clock generator 222 may be operable to compare the received timing information to feed back from the mixer 224 and/or from the local oscillator 230. In instances when frequency drift may occur in the local oscillator 230, the clock generator 222 may be operable to generate a signal that may tune the local oscillator 230 such that the mixer 224 may establish and/or maintain sync with one or more GNSS satellite signals. In some instances, the GNSS device 200B may lose sync with a GNSS satellite signal and the clock generator 222 may be operable to generate a signal that may enable the GNSS enabled device 200B to re-sync with the GNSS satellite signals.

In operation, the GNSS enabled device 200B may comprise suitable logic, circuitry, interfaces and/or code that may be operable to receive data network timing information, for example, reference clock signals from the data network primary reference clock 135, the network gateway 120 and/or the access point 110. The data network timing information may comprise a series of time stamped data packets and/or control data. The GNSS enabled device 200B may utilize the data network timing information to generate a signal that may tune the oscillator 230. The tuning signal may be sent by the processor 220 to the digital to analog converter 228 which may send a corresponding signal or tuning voltage $V_{tune}$ to the oscillator 230. The $V_{tune}$ signal may enable the GNSS enabled device 200B to establish and/or maintain reception of a GNSS satellite signal. In various embodiments of the invention, the data network timing information may be compared with feedback from the mixer 224 and/or from the local oscillator 230 to determine a clock signal or frequency for tuning the oscillator 230. The GNSS enabled device 200B may utilize the data network timing signal to generate one or more clock signals that may be utilized for baseband processing in the GNSS enabled device 200B. The GNSS enabled device 200B may be operable to demodulate an FM GNSS satellite signal, synchronize with a GNSS satellite signal and/or correlate with a GNSS satellite pseudorandom code sequence based on the data network timing information. In various embodiments of the invention, the GNSS enabled device 200B may lose contact with one or more GNSS satellites such as the GNSS satellites 162, 164 and 164 and/or may not receive data from the SRN 170 and/or the LBS server 140 and may be operable to utilize the data network timing information to establish and/or maintain reception of GNSS satellite signals.

Figure 3:
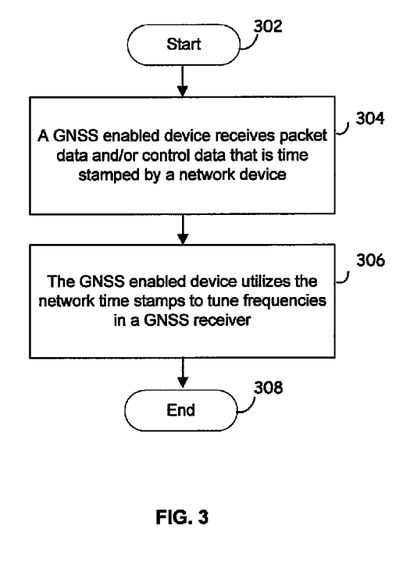
FIG. 3 is a flow chart illustrating exemplary steps for tuning frequencies and/or generating clock signals in a GNSS enabled device utilizing network time stamps, in accordance with an embodiment of the invention.

FIG. 3 is a flow chart illustrating exemplary steps for tuning frequencies and/or generating clock signals in a GNSS enabled device utilizing network time stamps, in accordance with an embodiment of the invention. Referring to FIG. 3, the exemplary steps may begin at step 302. In step 304, a GNSS enabled device 200 may receive packet data and/or control data that is time stamped by a network device. For example, the data network primary reference clock 135, the network gateway 120 and/or the access point 110 may generate timing information that may enable time stamping packet data and/or control data that may be sent to the GNSS enabled device 200. The time stamps may be received via beacon frames from the access point 110. In step 306, the GNSS enabled device 200 may utilize the time stamps to tune frequencies in the GNSS receiver 202. For example, the GNSS receiver 202 may comprise the oscillator 230 and may tune the oscillator 230 based on the received time stamps. The GNSS enabled device 200 and/or 200B may be operable to generate a plurality of clock signals for baseband processing, intermediate frequency processing and/or RF frequency processing. The exemplary steps may end at step 308.

In an embodiment of the invention, a GNSS enabled communication device 200 and/or 200B that is communicatively coupled to a network, may receive time stamps via the network, for example, via the data network 130. The time stamps may be generated based on one or more reference clock signals within the network. For example, the time stamps may be generated based on reference clock signals within the data network 130 by the data network primary reference clock 135, the network gateway 120 and/or the access point 110. A frequency that controls a GNSS receiver within the GNSS enabled communication device may be adjusted based on the received time stamps. Synchronization may be established and/or maintained with analog and/or digital GNSS satellite 162, 164 and/or 166 signals, based on the time stamps. For example, time stamps may be utilized when synchronization information is not available or is not adequate from one or both of the GNSS satellites 162, 164 and/or 166 signals and the satellite reference network 170 signals. The data network reference clock signals for the time stamps may be generated in one or more of the access point 110, the DSL Modem 120 or the cable modem 120 and the data network primary reference clock 135 within the data network 130, for example. A series of the time stamps may be received for adjusting the frequencies. Information from the time stamps may be compared with information output from one or both of the oscillator 230 and the mixer 224 in the GNSS enabled communication device 200 and/or 200B. A signal may be generated in the GNSS enabled communication device 200 and/or 200B, for adjusting the frequencies. The signal may be generated based on a comparison between information from the time stamps and output from one or both of the oscillator 230 and the mixer 224 in the GNSS enabled communication device 200 and/or 200B. Clock signals may be generated based on the time stamps, for one or more of baseband processing, intermediate frequency band signal processing and RF frequency band signal processing. The GNSS enabled communication device 200 and/or 200B may be operable to perform one or more of demodulation, pseudonoise code sequence correlation and/or synchronization with GNSS satellite 162, 164 and/or 166 signals based on the time stamps.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for estimating frequency of a GNSS enabled device based on time stamps.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a GNSS enabled communication device that is communicatively coupled to a network, said GNSS enabled communication device including a transceiver, a mixer, and an oscillator:
    receiving via said network using said transceiver, time stamps that are generated based on one or more reference clock signals within said network;
    downconverting, by said mixer, a received GNSS satellite signal using a clock signal of said oscillator to generate a mixer output signal;
    comparing a frequency of said time stamps to both a frequency of said clock signal from said oscillator and a frequency of said mixer output signal;
    generating a tuning signal based on said comparison; and
    adjusting a frequency of said clock signal that is generated by said oscillator based on said tuning signal, said clock signal used to demodulate said GNSS satellite signal received by said GNSS enabled communication device.

2. The method according to claim 1, comprising establishing and/or maintaining synchronization with GNSS satellite signals, based on said time stamps, when synchronization information from said GNSS satellite signals is not available and/or is not adequate for said synchronization.

3. The method according to claim 1, wherein said reference clock signals are generated in an access point, a DSL Modem, a cable modem, or a primary reference clock within said network.

4. The system according to claim 1, wherein said time stamps are received via beacon frames.

5. The method according to claim 1, comprising:
generating said clock signal based on said time stamps for baseband processing, intermediate frequency band signal processing, or RF frequency band signal processing.

6. The method according to claim 1, comprising:
correlating with a GNSS satellite signal pseudonoise code sequence based on said time stamps.

7. The method according to claim 1, comprising:
synchronizing with said GNSS satellite signal based on said time stamps.

8. A GNSS enabled communication device comprising:
a transceiver configured to communicate with a network;
an oscillator configured to generate a clock signal;
a mixer configured to downconvert a received GNSS satellite signal using said clock signal to generate a mixer output signal; and
a processor that is communicatively coupled to said transceiver, said processor configured to:
    receive via said network using said transceiver, time stamps that are generated based on one or more reference dock signals within said network,
    compare a frequency of said time stamps to both a frequency of said clock signal from said oscillator and to a frequency of said mixer output signal;
    generate a tuning signal based on said comparison; and
    adjust said frequency of said clock signal based on said tuning signal, wherein said GNSS enabled communication device is configured to demodulate said GNSS satellite signal received by said GNSS enabled communication device.

9. The GNSS enabled communication device according to claim 8, wherein said processor is configured to establish and/or maintain synchronization with GNSS satellite signals, based on said time stamps, when synchronization information from said GNSS satellite signals is not available and/or is not adequate for said synchronization.

10. The GNSS enabled communication device according to claim 8, wherein said reference clock signals are generated in an access point, a DSL Modem, a cable modem, or a primary reference clock within said network.

11. The GNSS enabled communication device according to claim 8, wherein said processor is configured to generate said clock signal based on said time stamps for baseband processing, intermediate frequency band signal processing, or RF frequency band signal processing.

12. The GNSS enabled communication device according to claim 8, wherein said processor is configured to correlate with a GNSS satellite signal pseudonoise code sequence based on said time stamps.

13. The GNSS enabled communication device according to claim 8, wherein said processor is configured to synchronize with said GNSS satellite signal based on said time stamps.

14. The GNSS enabled communication device according to claim 8, wherein the time stamps are received via beacon frames.

15. A method for communication, the method comprising:
in a GNSS enabled communication device that is communicatively coupled to a network, said GNSS enabled communication device including a mixer and an oscillator:
    downconverting, by said mixer, a received GNSS satellite signal using a clock signal of said oscillator to generate a mixer output signal;
    generating a tuning signal based on a comparison between a frequency of time stamps received via said network and a frequency of an output signal from said oscillator, and based on a comparison between said frequency of said time stamps and a frequency of said mixer output signal; and
    adjusting a frequency of said clock signal generated by the oscillator based on said tuning signal, said clock signal used to demodulate said GNSS satellite signal received by said GNSS enabled communication device.

* * * * *

UNITED STATES PATENT AND TRADEMARK OFFICE
CERTIFICATE OF CORRECTION

PATENT NO. : 9,651,675 B2  
APPLICATION NO. : 12/748050  
DATED : May 16, 2017  
INVENTOR(S) : Karaoguz et al.

Page 1 of 1

It is certified that error appears in the above-identified patent and that said Letters Patent is hereby corrected as shown below:

In Column 14, Line 9, replace "dock" with --clock--.

In Column 14, Line 9, replace "said network," with --said network;--.

In Column 14, Line 43, replace "wherein the time" with --wherein said time--.

Signed and Sealed this  
Eighth Day of May, 2018

Andrei Iancu  
*Director of the United States Patent and Trademark Office*